United States Patent
Okajima et al.

(10) Patent No.: US 7,966,050 B2
(45) Date of Patent: Jun. 21, 2011

(54) PORTABLE COMMUNICATION TERMINAL

(75) Inventors: Yusuke Okajima, Chiba (JP); Hiroyuki Takebe, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 743 days.

(21) Appl. No.: 11/920,928

(22) PCT Filed: May 15, 2006

(86) PCT No.: PCT/JP2006/309647
§ 371 (c)(1),
(2), (4) Date: Nov. 21, 2007

(87) PCT Pub. No.: WO2006/126411
PCT Pub. Date: Nov. 30, 2006

(65) Prior Publication Data
US 2009/0270139 A1    Oct. 29, 2009

(30) Foreign Application Priority Data

May 23, 2005    (JP) .................................. 2005-149956

(51) Int. Cl.
*H04M 1/00* (2006.01)
*H04K 3/00* (2006.01)
(52) U.S. Cl. ..................................... 455/575.7; 373/702
(58) Field of Classification Search ............... 455/575.1, 455/575.3, 575.4, 575.7; 343/702
See application file for complete search history.

(56) References Cited

U.S. PATENT DOCUMENTS

| 2005/0059444 A1 | 3/2005 | Martinez et al. |
| 2005/0107137 A1 | 5/2005 | Byun et al. |
| 2006/0258414 A1* | 11/2006 | Vance et al. ............... 455/575.7 |
| 2007/0225052 A1 | 9/2007 | Yamazaki et al. |

FOREIGN PATENT DOCUMENTS

CN    2731846 Y    10/2005
(Continued)

OTHER PUBLICATIONS

Operation manual mova SO506iC Felica, pp. 6-7 and 29.

*Primary Examiner* — Lee Nguyen
(74) *Attorney, Agent, or Firm* — Birch, Stewart, Kolasch & Birch, LLP

(57) ABSTRACT

In a portable communication terminal capable of assuming a state where a first casing 1 and a second casing 2 connected rotatably overlap substantially and a state where they are rotated relative to each other by 90° from the former state, the second casing 2 including a display unit 3 is rotated by about 90°, so that the display unit 3 is made horizontally long, thus enabling the displaying with good visibility. At the same time, the rotation causes the first casing 1 at an upper edge thereof not to overlap with the second casing 2, and an antenna 5 is disposed at the not-overlapping portion, thus increasing an electrical volume of the antenna to provide broad-band and good antenna characteristics. Since the antenna 5 overlaps with the second casing 2 when in normal use, the antenna does not protrude, thus keeping the terminal compact and slim to provide excellent portability. In the portable communication unit provided with a rotatable casing including a display unit, the terminal as a whole can be kept compact so as not to let an antenna protrude therefrom both when in normal use and during standby, the display with a high level of visibility is enabled depending on the contents, and good antenna characteristics can be achieved.

20 Claims, 4 Drawing Sheets

FOREIGN PATENT DOCUMENTS

| | | |
|---|---|---|
| CN | 2733769 Y | 10/2005 |
| EP | 0518526 A1 | 12/1992 |
| EP | 1441411 A1 | 7/2004 |
| GB | 2406748 A | 4/2005 |
| JP | 2001-156893 A | 6/2001 |
| JP | 2003-134205 A | 5/2003 |
| JP | 2003-134214 A | 5/2003 |
| JP | 2004-54409 A | 2/2004 |
| JP | 2004-222173 A | 8/2004 |
| JP | 2005-109971 A | 4/2005 |
| JP | 2005-147401 A | 6/2005 |
| JP | 2005-318406 A | 11/2005 |
| JP | 2006-19925 A | 1/2006 |

\* cited by examiner

# PORTABLE COMMUNICATION TERMINAL

TECHNICAL FIELD

The present invention relates to a portable communication terminal and particularly relates to a portable communication terminal including a rotatably connected casing.

BACKGROUND ART

In recent years, cellphones have been provided with a wide variety of functions, and cellphones in various shapes also have been offered for the purpose of differentiating them from other models. Due to an increase in the number of components to implement such a variety of functions and such various shapes of cellphones, the environment surrounding antennas mounted on the cellphones changes, which may be various factors degrading characteristics thereof. In principle, it is necessary to make the electrical volume of an antenna large enough to obtain good antenna characteristics.

FIG. 1 is a perspective view showing the configuration of a general folding-type cellphone. As shown in FIG. 1, the general folding-type cellphone includes a first casing 101 and a second casing 102. A lower edge of the first casing 101 and an upper edge of the second casing 102 are connected via a hinge 110 so as to be foldable. The first casing 101 is provided with a LCD display unit 103 and an antenna 105, whereas the second casing 102 is provided with an operation unit 104 including operation buttons and movement/selection keys, for example.

In the thus configured folding-type cellphone, the antenna 105 protrudes from the first casing 101 or the second casing 102 both when the first casing 101 and the second casing 102 are opened and when they are folded. Therefore, a sufficient electrical volume of the antenna 105 is ensured and good antenna characteristics can be obtained with a small size.

DISCLOSURE OF THE INVENTION

Problem to be Solved by the Invention

However, since there is a demand for making cellphones smaller and slimmer, antennas also have been required to be smaller and thinner. Meanwhile, along with the development of multifunctional cellphones, since antennas have to be used for a plurality of systems, broader-band antenna characteristics have been required. Smaller and thinner antennas, however, are susceptible to surrounding environments such as a ground conductor. As a result, antenna efficiency is degraded and the electrical volume also is reduced, thus resulting in a narrower band.

Furthermore, multifunctional cellphones, especially with functions of reproducing moving images and receiving TV broadcast, require a still higher communication quality. More specifically, broader-band and better antenna characteristics are needed.

Such added functions of reproducing moving images and of receiving TV broadcast further require a cellphone capable of displaying not only in a conventional vertically long mode but also in a horizontally long mode depending on the functions.

It is an object of the invention to provide a portable communication unit with a rotatable casing, the portable communication unit being capable of keeping a compact size of the terminal with no antenna portion protruding therefrom, for example, when in normal use and during standby, while enabling the display with a high level of visibility when higher-quality communication is required for some contents, and allowing for broad-band and good antenna characteristics.

Means for Solving the Problem

According to the present invention, in a portable communication unit with a rotatable casing, the portable wireless terminal as a whole can be kept compact and an antenna can be kept from being exposed or protruding during standby and when in normal use including a call. When higher-quality communication is required for receiving moving images, for example, the antenna may be exposed or protrude so as to provide broad-band and good antenna characteristics, whereby the display with a high level of visibility is enabled depending on the contents.

To this end, a portable communication terminal according to the present invention comprises a first casing and a second casing provided rotatably with respect to the first casing. The second casing assumes at least a first state and a second state. In the first state, the second casing substantially overlaps with the first casing. In the second state, the second casing has been rotated by about 90° from the first state. In the second state, the first casing has a protruding portion that does not overlap with the second casing, and an antenna is disposed at the protruding portion.

A portable communication terminal according to the present invention comprises: a first casing; a second casing provided rotatably with respect to the first casing; and a third casing disposed openable and closable with respect to the first casing. The second casing assumes at least a first state and a second state, the second casing substantially overlapping with the first casing in the first state and rotating by about 90° from the first state in the second state. In the second state, the first casing has a protruding portion that does not overlap with the second casing, and an antenna is disposed at the protruding portion.

In the first state the protruding portion is positioned at an upper edge of the first casing in a display direction of the display unit, so that the display unit can rotate. The display unit may be vertically long in the first state and may be horizontally long in the second state, whereby display with a high level of visibility is enabled depending on the contents.

The second casing may comprise display means, and in the first state the protruding portion may be positioned at an upper edge of the first casing in a display direction of the display unit. The second casing may be formed smaller than the first casing so that there is a region of the first casing that is not covered with the second casing in the first state, and an operation unit may be disposed at the region. The display unit may be vertically long in the first state and may be horizontally long in the second state.

The second casing is formed smaller than the first casing so that there is a region of the first casing that is not covered with the second casing in the first state, and an operation unit is disposed at the region, whereby the operability can be improved.

The portable communication terminal may further comprise: rotation detection means that detects rotation of the first casing and the second casing; and RF signal control means that controls a RF signal to be fed to the antenna in accordance with a rotation detection signal from the rotation detection means. The RF signal control means may perform switching of a matching state of the antenna.

With the use of this RF signal control means, the matching state of the antenna can be switched. With the concurrent use of a second antenna provided separately from the antenna, switching between the antenna and the second antenna can be performed, so that better antenna characteristics can be provided.

The switching between the first antenna and the second antenna to which a RF signal is to be fed may be interlocked with switching of the display direction of the display unit. Interlocking the switching between the antennas to which a RF signal is to be fed with that of the display facilitates the operation.

The antenna may be for receiving broadcast so that, when TV is viewed, the display unit may be horizontally long (second state) to effectively utilize the area of the display, and at the same time broad-band and good antenna characteristics can be always provided when TV is viewed.

EFFECTS OF THE INVENTION

As described in detail in the above, a portable communication unit of the present invention includes a rotatable casing provided with a display unit, in which a first casing and a second casing overlap with each other when in normal use and during standby so that an antenna overlaps with the second casing. Therefore, the configuration suitable for carry and storage can be achieved because the antenna does not protrude.

Meanwhile, by rotating the second casing with respect to the first casing by 90° using a rotational mechanism, a display unit is made horizontally long, thus enabling the display with a high level of visibility when images and mail are viewed, for example. At the same time, the antenna disposed at the upper edge of the first casing can be exposed to the space, and therefore the electrical volume of the antenna is increased, so that broad-band and good antenna characteristics suitable for high-quality communication can be provided.

BRIEF DESCRIPTION OF THE DRAWINGS

FIG. 2(a) is a perspective view when in normal use, and FIG. 2(b) is a perspective view when a second casing has been rotated.

FIG. 3(a) is a perspective view when in normal use, and FIGS. 3(b) and 3(c) are perspective views when a second casing has been rotated.

Figure 1:
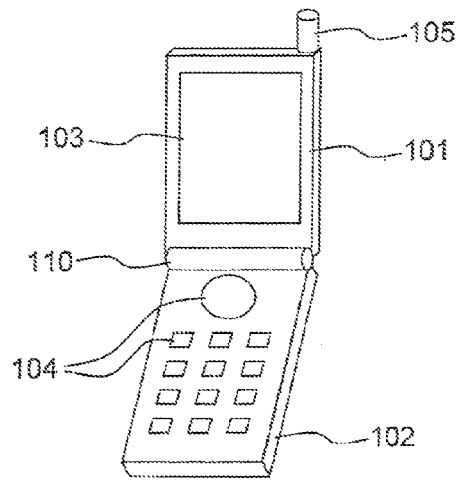
FIG. 1 shows a general folding-type cellphone.

DESCRIPTION OF THE NUMERALS 1 first casing
2 second casing
3 display unit
4 operating unit
5 first antenna
6 receiver
7 microphone
8 rotation mechanism
9 third casing
10 hinge
11 second antenna
12 first matching circuit
13 second matching circuit
14 wireless unit
15 switch
16 rotation detector

BEST MODE FOR CARRYING OUT THE INVENTION

Figure 2:
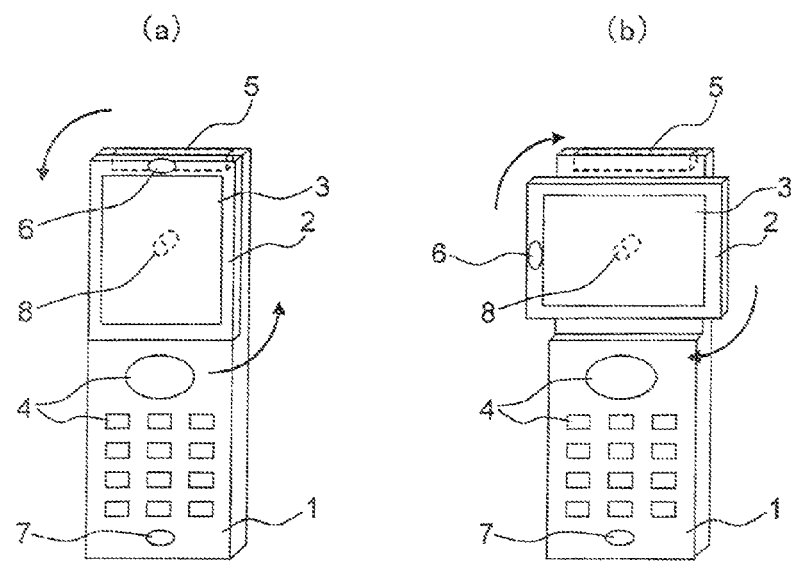
FIG. 2 is a perspective view of a portable communication terminal according to a first embodiment of the present invention.

In the following, with a cellphone being taken for example, a portable wireless terminal according to one embodiment of the present invention will be exemplified with reference to the drawings. FIG. 2 is a perspective view showing a portable wireless terminal according to a first embodiment of the present invention, where FIG. 2(a) shows a first state that has a posture when in normal use, and FIG. 2(b) shows a second state that has its posture rotated.

The portable wireless terminal shown in FIGS. 2(a) and (b) includes a first casing 1 and a second casing 2 that is rotatably connected with the first casing 1. The first casing 1 and the second casing 2 can rotate relative to each other in a virtual plane substantially parallel to their opposing surfaces, with the normal to the virtual plane as a rotational axis. The first casing 1 includes a general operation unit 4, a microphone 7 for call disposed at a lower edge thereof, and an antenna 5 disposed at an upper edge thereof. The second casing 2 includes a display unit 3 such as a LCD and a receiver 6 disposed at an upper edge thereof in the first state. The second casing 2 is connected with the first casing 1 via a rotational mechanism 8 indicated by the broken line, which is disposed at a substantially center portion of the display unit 3. The second casing 2 is disposed rotatably with respect to the first casing 1 in the same plane that the display unit 3 lies in.

The portable wireless terminal of the present embodiment can assume the first state as shown in FIG. 2(a) where the second casing 2 substantially overlaps with the first casing 1 and the second state as shown in FIG. 2(b) where the second casing 2 is prevented from overlapping with the antenna 5 provided at the first casing 1 by rotating the second casing 2 by about 90° with respect to the first casing 1, for example. In the first state, the display unit 3 is vertically long, whereas in the second state the display unit 3 is horizontally long. Thus, by rotating the display unit 3, at least two display directions are enabled. Both states are normal display states allowing a user to view the information of FIG. 2(a) or (b) in a normal display state.

Taking the configuration of the present embodiment for example for explanation, when in normal use (the first state), the first casing 1 and the second casing 2 substantially overlap with each other as shown in FIG. 2(a), where the display unit 3 is vertically long. Since there is no protrusion from the first casing 1 (region exposed from the first casing 1), the configuration is suitable for carry as well as storage.

On the other hand, as shown in FIG. 2(b), when the second casing 2 is rotated by about 90° with respect to the first casing 1 via the rotational mechanism 8, the display unit 3 is horizontally long, thus making it easy to view images and mail, for example. Additionally, since the antenna 5 disposed at the upper edge of the first casing 1 can be exposed to the open space, the electrical volume of the antenna is increased, whereby broad-band and good antenna characteristics can be provided. Thus, the second state enables a state suitable for data communications of images, for example, which requires a higher communication quality.

Figure 3:
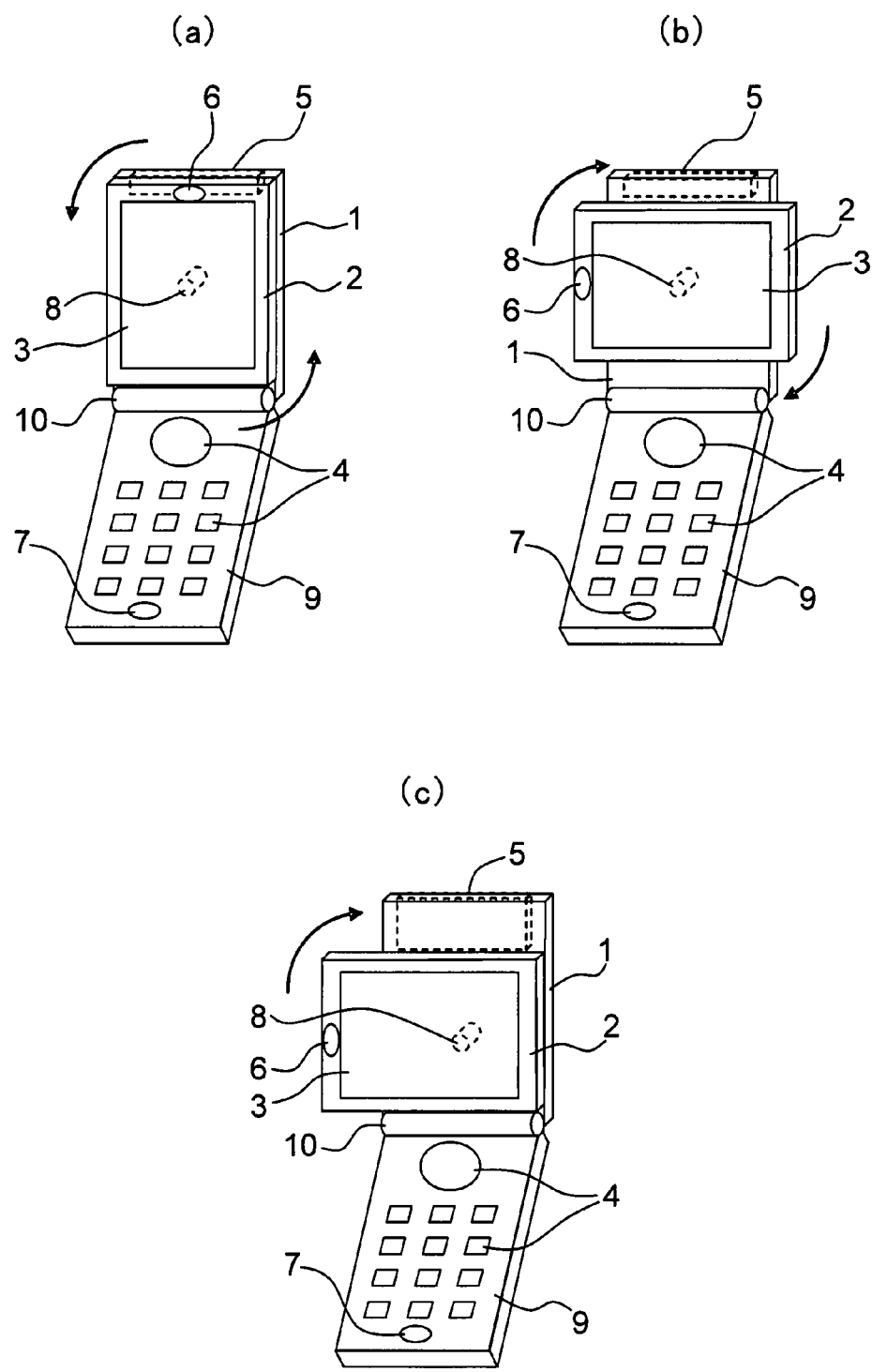
FIG. 3 is a perspective view of a portable communication terminal according to a second embodiment of the present invention.

FIG. 3 is a perspective view showing a portable wireless terminal according to a second embodiment of the present invention, where FIG. 3(a) shows a first state that has a posture when in normal use, and FIG. 3(b) shows a second state that has its posture rotated. FIG. 3 illustrates an example of the portable wireless terminal where the present invention is applied to a folding-type cellphone. As shown in FIG. 3, the portable wireless terminal of the present embodiment includes a first casing 1, a second casing 2, a display unit 3, an operation unit 4, an antenna 5, a receiver 6, a microphone 7, a rotational mechanism 8, a third casing 9, and a hinge 10.

In this way, the portable wireless terminal of the present embodiment is composed of the first casing 1, the second casing 2, and the third casing 9. The second casing 2 is connected with the first casing 1 via the rotational mechanism 8 so that the second casing 2 can rotate with respect to the first casing 1 in the same plane that the display unit 3 lies in. The rotational axis of the rotational mechanism 8 is positioned at a substantially center portion of the display unit 3. The third casing 9 further is coupled with the first casing 1 below a lower edge of the second casing 2 so as to be foldable via the hinge 10. The respective casings are arranged so that when folded, a surface of the third casing 9 on the side of the operation unit 4 overlaps with a surface of the second casing 2 on the side of display unit 3. The first casing 1 does not directly overlap with the third casing 9.

The first casing 1 has an upper edge, in the vicinity of which the antenna 5 is provided. The second casing 2 is provided with the receiver 6 and the display unit 3, and the third casing 9 is provided with the microphone 7 and the operation unit 4 including a plurality of operation keys.

More specifically, the antenna 6 is connected with a wireless circuit via an antenna feeder circuit formed on a circuit board disposed inside the casing.

Similarly to the configuration of the portable wireless terminal according to the above first embodiment that is a straight-type portable wireless terminal, even in the folding-type portable wireless terminal according to the configuration of the present embodiment, the first casing 1 and the second casing 2 overlap with each other when in normal use as shown in FIG. 3(a), where the display unit 3 is vertically long and there is no protrusion, thus making it suitable for carry as well as storage.

On the other hand, as shown in FIG. 3(b), when the second casing 2 is rotated by about 90° with respect to the first casing 1 via the rotational mechanism 8, the antenna 5 disposed at the upper edge of the first casing 1 can be exposed to the space, and therefore the electrical volume of the antenna is increased, so that good antenna characteristics can be obtained. Additionally, the display unit 3 is made horizontally long, thus making it easy to view images and mail, for example.

It should be noted here that although the above first embodiment and second embodiment exemplify the case where the rotational axis of the second casing 2 is disposed at the center of the display unit 3, it can be disposed at any position insofar as there is a open-space left on the upper side of the first casing 1 when the second casing 2 is rotated by 90°. For instance, as shown in FIG. 3(c), the rotational axis 8 may be disposed on the lower side of the casing, whereby when the first casing 1 is rotated by 90°, the first casing 1 and the second casing 2 overlap with each other on the lower side of the second casing 2, and therefore there is a large protrusion space on the upper side, thus making an antenna area broader. Furthermore, the rotational axis is not limited to one point, and the portable wireless terminal may be provided with a plurality of rotational axes so as to be slidable as the casing is rotated.

Figure 4:
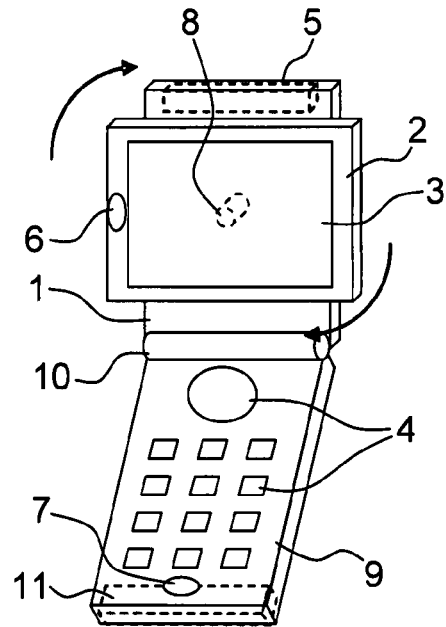
FIG. 4 is a perspective view of a portable communication terminal according to a third embodiment of the present invention.

FIG. 4 is a perspective view showing an exemplary portable wireless terminal according to a third embodiment of the present invention. Similarly to the portable wireless terminal of the above second embodiment, the portable wireless terminal of FIG. 4 is a folding-type cellphone including a rotatable second casing 2 provided with a display unit 3. In the present embodiment, a third casing 9 further includes a second antenna 11, a rotation detector (not illustrated) that detects the rotation of the second casing 2 with respect to a first casing 1, and a RF switch (not illustrated) that performs switching of a RF signal to be fed to the antenna 11 in accordance with a signal from this rotation detector.

In the above portable wireless terminal, the rotation detector detects the rotation angle of the second casing 2, and the RF switch performs switching between a first antenna 5 and the second antenna 11 in accordance with the angle. For instance, when the rotation angle of the second casing 2 is 0° (a first state), the RF switch performs the switching to use the second antenna 11, whereas when the rotation angle is 90° (a second state), the RF switch performs the switching to use the first antenna 5. At this time, the switching of the display direction of the display unit may be controlled in conjunction with the switching of the RF signal. Since the first antenna 5 is used only when the second casing 2 assumes the second state, influences by the factors degrading the antenna characteristics (e.g., a ground conductor of the second casing 2) can be avoided. Therefore, the casings can be made significantly thin.

According to the portable wireless terminal of the present embodiment, good antenna characteristics can be obtained even with a significantly low-profile portable wireless terminal in the case that data communication requiring a high communication quality is carried out while holding the portable wireless terminal at a lower portion thereof by a hand, as well as in the case that the lower portion of the terminal is not covered with a hand, for example, during standby and during a call.

Figure 5:
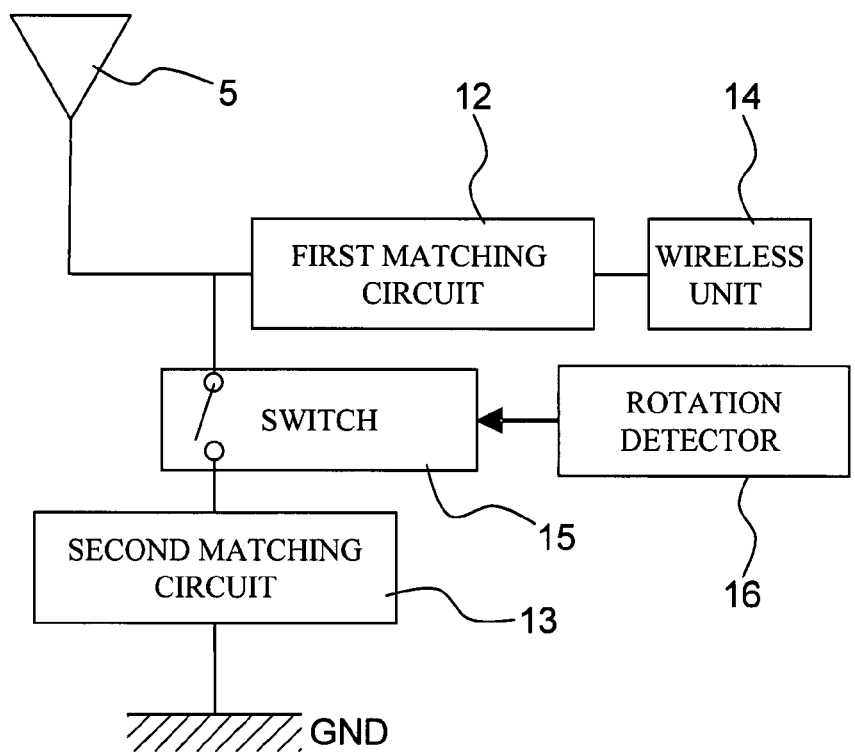
FIG. 5 is a schematic block diagram of a portable communication terminal according to a fourth embodiment of the present invention.

Next, the following describes a portable wireless terminal according to a fourth embodiment of the present invention with reference to the drawings. FIG. 5 is a functional block diagram showing an exemplary configuration of a portable wireless terminal according to the present embodiment.

Similarly to the portable wireless terminal according to the above third embodiment, the portable wireless terminal of FIG. 5 includes a rotation detector 16 that detects the rotation of a second casing 2, and the matching state of an antenna 5 is switched in accordance with a signal from the rotation detector 16. The portable wireless terminal includes a wireless unit 14, the antenna 5 connected with the wireless unit 14 via a first matching circuit 12, a switch 15 that turns ON/OFF in accordance with a signal from the rotation detector 16, and a second matching circuit 13 inserted between the first matching circuit 12 and the antenna 5 via the switch 15.

In the above configuration, when the second casing 2 is at 0° (a first state), the switch 15 turns ON, so that the matching of the antenna 5 is obtained using the first matching circuit 12 and the second matching circuit 13. When the second casing 2 is at 90° (a second state), the switch 15 turns OFF, so that the matching of the antenna 5 is obtained only using the first matching circuit 12.

According to the present embodiment, even when the rotation of the second casing 2 causes a change in a proximity state of the antenna 5 to a ground conductor of the second casing 2 or the like, thus resulting in a change in input impedance of the antenna 5, the antenna input impedance can be corrected, and therefore good antenna characteristics can be achieved in either state.

Figure 6:
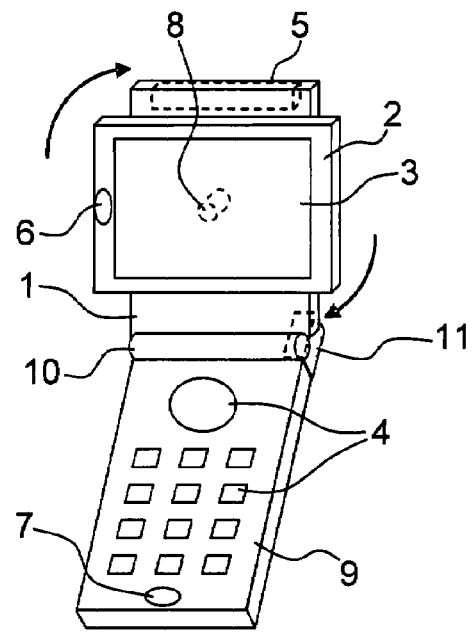
FIG. 6 is a perspective view of a portable communication terminal according to a fifth embodiment of the present invention.

FIG. 6 is a perspective view showing an exemplary configuration of a portable wireless terminal according to a fifth embodiment of the present invention, which shows an example of a cellphone capable of receiving TV. Similarly to the above second embodiment, the portable wireless terminal of FIG. 6 is a folding-type cellphone including a rotatable second casing 2 provided with a display unit 3. A third casing 9 has an upper edge, at which a second antenna 11 is provided. The second antenna 11 is provided in the vicinity of a connecting portion of a first casing 1 and the third casing 9, for example. A first antenna 5 is a low-profile antenna exclusively used for receiving TV, and the second antenna 11 is exclusively used for cellular transmission and reception.

When viewing TV, by rotating the second casing 2 by 90°, the display area of the display unit 3 can be effectively utilized and the first antenna 5 can be exposed and protrude from behind the second casing 2.

When TV function is used, the present embodiment allows the first antenna 5 for TV, which requires broad-band and good antenna characteristics in relatively low frequencies during use, to protrude from the second casing 2, whereby the influences by the second casing 2 that is in the vicinity of the first antenna 5 and covers the first antenna 5 can be reduced. As a result, a low-profile antenna with a large electrical volume can be built. On the other hand, when TV function is not used, the low-profile first antenna 5 is accommodated behind the second casing 2 by rotating the second casing 2, thus improving the portability of the portable wireless terminal.

Figure 7:
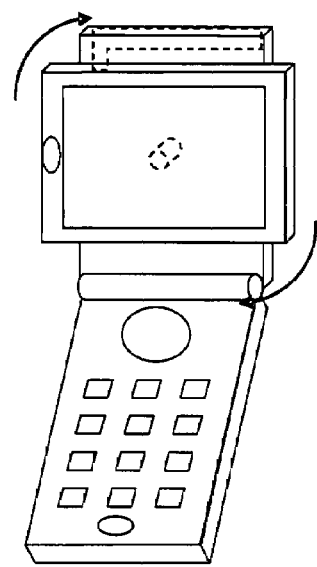
FIG. 7 shows a first variation of the present embodiment, in which an L-shaped antenna is used as the antenna of the portable communication terminal.

Next, the following describes a first variation of the present embodiment (FIG. 7) in which an L-shaped antenna is used as the antenna of the portable wireless terminal of the present embodiment, and a second variation (FIG. 8) in which a folding-type antenna is used. FIG. 7 is a perspective view showing an exemplary configuration of a portable wireless terminal according to the first variation. As shown in FIG. 7, according to the portable wireless terminal of this variation example, a so-called L-shaped antenna including a portion extending horizontally and a portion extending downward unbroken therefrom is used as the first antenna 5 in the configuration of FIG. 6 (since the same reference numerals are to be assigned to the components common to those in FIG. 6, the reference numerals are omitted in FIG. 7 and FIG. 8). The L-shaped antenna can increase the volume of the antenna, and therefore antenna characteristics can be enhanced. In this case also, when TV is viewed, the display area of the display unit 3 can be effectively utilized by rotating the second casing 2 by 90°, and the first antenna 5 can be exposed and protrude from behind the second casing 2.

When TV function is used, the present embodiment allows almost the entire L-shaped antenna 5 for TV, which requires broad-band and good antenna characteristics in relatively low frequencies during use, to protrude from the second casing 2, whereby the influences by the second casing 2 that is in the vicinity of the L-shaped antenna 5 and covers the antenna 5 can be reduced. As a result, a low-profile antenna with a large electrical volume can be built. On the other hand, when TV function is not used, the first antenna 5 is accommodated behind the second casing 2 by rotating the second casing 2, thus leading to the advantage of improving the portability of the portable wireless terminal. In this case, communication (including standby) is carried out using a second antenna 11.

Figure 8:
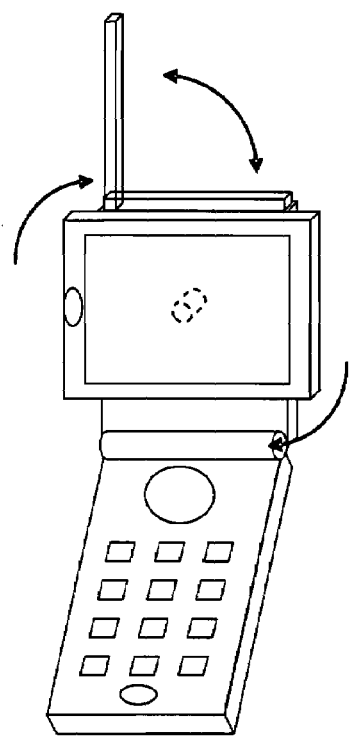
FIG. 8 shows a second variation of the present embodiment, in which a fold-down antenna is used as the antenna of the portable communication terminal.

FIG. 8 shows an example including, as the first antenna 5, an antenna having a fold-down mechanism letting the antenna be folded down (a retractable antenna: a fold-down direction is generally in a virtual plane substantially parallel to opposing surfaces of the first casing 1 and the second casing 2). As shown in FIG. 8, when broad-band and good antenna characteristics in relatively low frequencies during use are required (for TV), the display unit 3 is made horizontally long, thus making an antenna 5 having a fold-down mechanism exposed, and then the antenna 5 is allowed to stand. Thus, when TV function is used, almost the entire antenna 5 is allowed to protrude from behind the second casing 2, whereby the influences by the second casing 2 that is in the vicinity of the L-shaped antenna 5 and covers the antenna 5 can be reduced. As a result, a low-profile antenna with a large electrical volume can be built. On the other hand, when TV function is not used, the first antenna 5 is folded down to put itself behind the display unit 3, whereby the first antenna 5 is accommodated behind the second casing 2, thus leading to the advantage of improving the portability of the portable wireless terminal. In this case, communication (including standby) is carried out using a second antenna 11.

As stated above, in the variation examples, the shape of the second antenna is devised so as to improve the antenna characteristics when TV function is used, thus making communication performance favorable.

In addition to the fold-down antenna, various types of adjustable antennas such as a pull-out type antenna that can be extended and retracted in its extension direction are available as the antenna having a mechanism making itself adjustable.

As described in detail in the above, a portable wireless unit of the present embodiments includes a rotatable casing provided with a display unit, in which a first casing and a second casing overlap with each other when in normal use and during standby so that an antenna overlaps with the second casing. Therefore, the configuration suitable for carry and storage can be achieved because the antenna does not protrude.

Meanwhile, by rotating the second casing with respect to the first casing by 90° using a rotational mechanism, a display unit is made horizontally long, thus enabling the display with a high level of visibility when images and mail are viewed, for example. At the same time, the antenna disposed at the upper edge of the first casing can be exposed to the space, and therefore the electrical volume of the antenna is increased, so that broad-band and good antenna characteristics suitable for high-quality communication can be provided.

As stated above, the present embodiments have been exemplified using a portable wireless terminal of a straight-type or a folding-type. However, in addition to that, various cellphones of a slide-type, a rotation slide-type, etc., can be configured in the same manner, from which the same effects can be obtained. Take, for instance, a portable communication terminal including a first casing and a second casing provided relatively movable with respect to the first casing, where the portable communication terminal assumes a first state in which the second casing substantially overlaps with the first casing and a second state in which there is a region where the second casing does not overlap with the first casing. When an antenna is disposed at the not-overlapping region in the second state, the first casing and the second casing may slide instead of the rotation or may slide while rotating, or the second casing may be folded to the back of the first casing, from which similar effects can be obtained. Although the above-stated examples deal with a general portable communication terminal, the present invention is preferably applied to a cellphone having a TV receiving function. In that case, the antenna may be an antenna for TV receiving.

INDUSTRIAL APPLICABILITY

The present invention is applicable to portable wireless terminals.

The invention claimed is:

1. A wireless terminal comprising:
an antenna;
a first casing at which said antenna is disposed; and
a second casing,
wherein a first state in which said second casing substantially overlaps with said first casing is changed to a second state in which said second casing has been rotated, so as to make said antenna exposed to an open space in a protruding portion of said first casing that protrudes from said second casing as viewed from the side of said second casing, and
wherein in said second state said first casing protrudes from said second casing on a side other than the side on which said protruding portion is located.

2. The wireless terminal according to claim 1, wherein in said second state said first casing includes a plurality of portions that do not overlap with said second casing.

3. The wireless terminal according to claim 1, further comprising a third casing connected with said first casing, wherein
when said first casing and said third casing are folded in said first state, said second casing is disposed between said antenna and said third casing.

4. The wireless terminal according to claim 3, wherein said antenna is disposed at said first casing at an edge different from the edge at which said first casing is connected with said third casing.

5. The wireless terminal according to claim 1, wherein said antenna is built in said first casing.

6. The wireless terminal according to claim 1,
wherein said second casing comprises a display unit, and
wherein when said first state is changed to said second state, said display unit displays data received from said antenna.

7. The wireless terminal according to claim 1, further comprising: RF signal control means that controls a RF signal to be fed to said antenna in accordance with a movement detection signal from said movement detection means.

8. The wireless terminal according to claim 7, wherein said RF signal control means performs switching of a matching state of said antenna.

9. The wireless terminal according to claim 7, wherein said antenna is a first antenna, and further comprising a second antenna provided separately from said first antenna,
wherein said RF signal control means controls switching between said first antenna and said second antenna to which a RF signal is to he fed.

10. The wireless terminal according to claim 1, wherein said antenna comprises a fold-down or a pull-out mechanism.

11. The wireless terminal according to claim 1, wherein said antenna is for receiving broadcast or for receiving communications.

12. A wireless terminal comprising:
an antenna;
a first casing at which said antenna is disposed; and
a second casing,
wherein a first state in which there is an overlap between said antenna and said second casing can he changed to a second state in which, by moving said second casing along said first casing, some of said overlap is cancelled partially, and an end of said first casing on a side on which said antenna is not disposed does not overlap with said second casing.

13. The wireless terminal according to claim 12, wherein in said second state said first casing overlaps with said second casing between said antenna and said end on said side on which said antenna is not disclosed.

14. The wireless terminal according to claim 12, further comprising a third casing connected with said first casing, wherein
when said first casing and said third casing are folded in said first state, said second casing is disposed between said antenna and said third casing.

15. The wireless terminal according to claim 12, wherein said moving includes moving by rotation or by sliding.

16. The wireless terminal according to claim 12, wherein said antenna is built in said first casing.

17. The wireless terminal according to claim 12,
wherein said second casing comprises a display unit,
wherein when said first state is changed to said second state, said display unit displays data received from said antenna.

18. The wireless terminal according to claim 12, further comprising: RF signal control means that controls a RF signal to be fed to said antenna in accordance with a movement detection signal from said movement detection means; and further comprising a second antenna provided separately from said first antenna.
wherein said RF signal control means controls switching between said first antenna and said second antenna to which a RF signal is to be fed.

19. A wireless terminal comprising:
a first antenna;
a first casing at which said antenna is disposed; and
a second casing,
wherein a first state in which said second casing substantially overlaps with said first casing is changed to a second state in which said second casing has been rotated, so as to make said first antenna exposed to an open space; further comprising:
movement detection means that detects movement of said first casing and said second casing; and RF signal control means that controls a RF signal to be fed to said first antenna in accordance with a movement detection signal from said movement detection means, and further comprising a second antenna provided separately from said first antenna,
wherein said RF signal control means controls switching between said first antenna and said second antenna to which a RF signal is to be fed.

20. The wireless terminal according to claim 19, further comprising a display unit, wherein the switching between said first antenna and said second antenna to which a RF signal is to be fed is interlocked with switching of the display direction of said display unit.

* * * * *